United States Patent

Nyman et al.

[11] 3,875,285
[45] Apr. 1, 1975

[54] PROCESS FOR SELECTIVE EXTRACTION OF FERRIC IRON FROM TRIVALENT CHROMIUM BY ALKYL-PHOSPHOROUS COMPOUNDS

[75] Inventors: Bror Goran Nyman, Turku; Stig-Erik Hultholm, Pori, both of Finland

[73] Assignee: Outokumpu Oy, Helsinki, Finland

[22] Filed: Aug. 30, 1973

[21] Appl. No.: 392,963

[30] Foreign Application Priority Data
Sept. 4, 1972 Finland............... 2439/72

[52] U.S. Cl................ 423/54, 423/139, 75/101 BE
[51] Int. Cl........................................... C01g 49/00
[58] Field of Search.................... 423/139, 54, 53; 75/101 BE, 119, 121; 204/51

[56] References Cited
UNITED STATES PATENTS

| | | | |
|---|---|---|---|
| 3,193,381 | 7/1965 | George et al. | 423/139 |
| 3,320,032 | 5/1967 | Feller | 75/101 BE |
| 3,343,912 | 9/1967 | Schulz | 75/101 BE |
| 3,666,446 | 5/1972 | Cook et al. | 75/101 BE |
| 3,787,555 | 1/1974 | Bruen et al. | 423/139 X |

OTHER PUBLICATIONS

Ishimori et al., "Solvent Extraction of Inorganic Ions with Tri-n-octyl Phosphine Oxide," Nippon Genshinyoku Gakkaishi, Vol. 4, No. 2, 1962, pp. 41–50.

*Primary Examiner*—O. R. Vertiz
*Assistant Examiner*—Brian E. Hearn
*Attorney, Agent, or Firm*—Brooks Haidt & Haffner

[57] ABSTRACT

A process for a selective extraction of iron (III) from an electrolyte-containing aqueous solution in which chromium (III) and iron (III) are present, comprising extracting iron (III) at an elevated temperature with an extraction solution containing acid organic alkyl-substituted phosphorus compound and with a high extraction agent content from a chromium (III) sulphate solution containing over 50 g $H_2SO_4/l$, and then regenerating the separated extraction agent before it is recycled to the extraction process.

7 Claims, 2 Drawing Figures

PROCESS FOR SELECTIVE EXTRACTION OF FERRIC IRON FROM TRIVALENT CHROMIUM BY ALKYL-PHOSPHOROUS COMPOUNDS

BACKGROUND OF THE INVENTION

Field of the Invention

The present invention relates to a process for a selective separation of iron (III) from a water solution which contains an electrolyte or sulphuric acid and in which chromium (III) and iron (III) are present.

SUMMARY OF THE INVENTION

Usually a considerable amount of iron is present in chromium ores. Therefore, when different chromium products such as pre-alloys, chrome iron, metallic chromium, various chromium salts, chromic acid, and chromium pigments are produced, it is important that the iron can be approximately separated from the chromium. According to the present invention, this difficult metal separation problem has been solved in regard to extraction solutions containing sulphuric acid, by developing a highly selective separation process, by which iron can be removed to the desired extent. Even if the content of sulphuric acid in the extraction solution in question is more than 100 g/l, by a counter-current extraction with a suitable light petroleum solution of HDEHP, according to the invention, without changing the chromium content in the extraction solution, the iron content in the solution can be lowered from an initial value of, for example, 30 g/l, to a value under 5 mg/l.

According to the invention extraction of iron (III) takes place at an elevated temperature with an extraction solution containing acid organic alkyl-substituted phosphorus compound and with a high extraction agent content from a chromium (III) sulphate solution of which the sulphuric acid content is over 50 g $H_2SO_4$/l, whereafter the separated extraction agent is regenerated before it is recycled to the extraction process.

DESCRIPTION OF THE PREFERRED EMBODIMENTS

Figure 1:
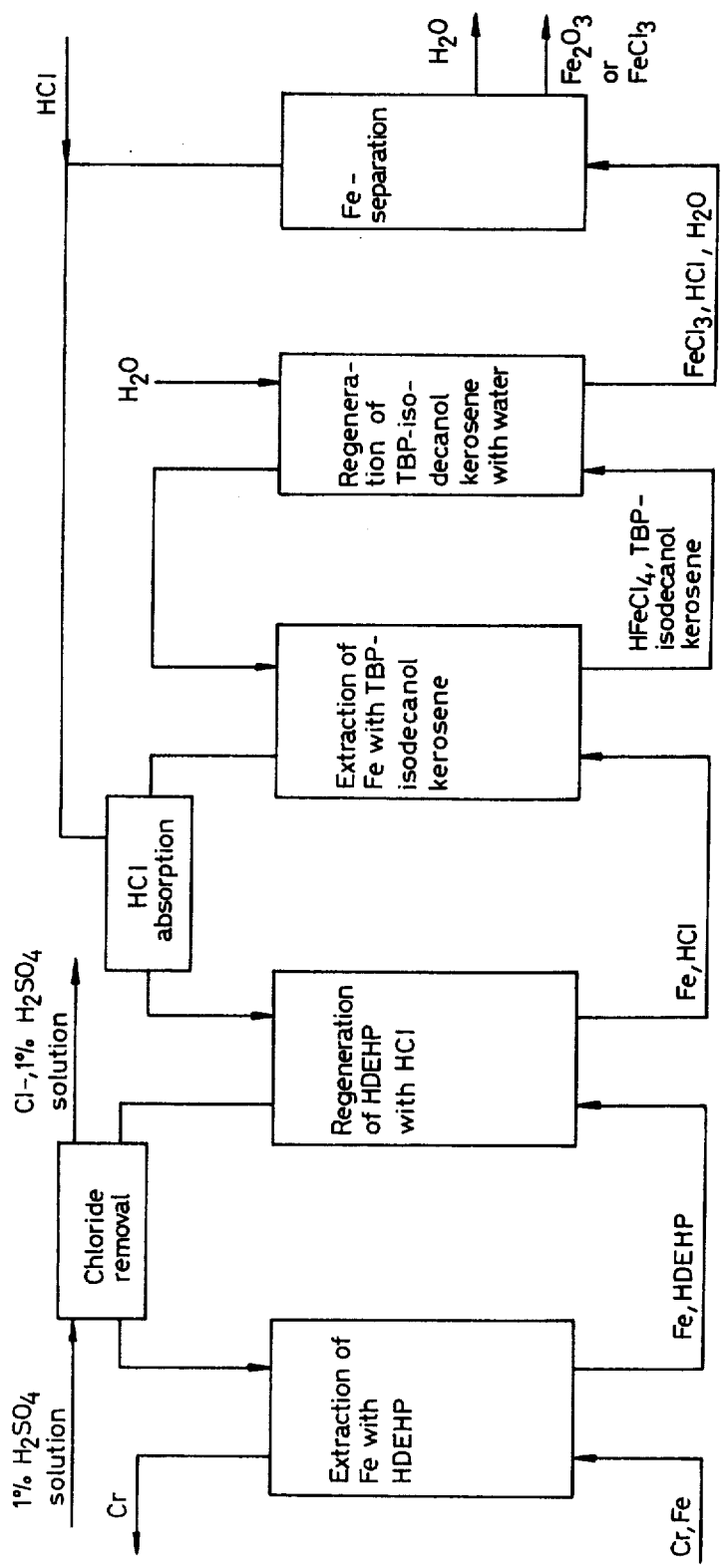
FIGS. 1 and 2 show flow schemes of two alternative embodiments of the invention.

In order to eliminate crystal formation in a chromium (III) sulphate solution which contains considerable amounts of, for example, sodium or ammonium ions, the solution must be kept at a raised temperature. An elevated temperature is also necessary in regard to extraction. The extraction of iron (III) with a light petroleum solution of HDEHP is sufficiently rapid at a temperature of 55°–60°C. If the solutions in questions have been somewhat heated, the phases can be very well separated after the mixing of the phases, owing to their lower viscosity. The lowering of the viscosity may be considerable particularly in a concentrated chromium solution.

Because according to this invention a fully selective separation of iron can be carried out with, for example, a light petroleum solution of HDEHP from a chromium (III) sulphate solution containing sulphuric acid at a raised temperature, the separation of chromium (III) and iron (III) is relatively easy. It must, however, be made certain that the extraction solution fed into the extraction stage does not contain chromium with the valence of six, because then there is some danger that the chromium may be extracted along with the iron. This is because the limited amount of alcohol present in the extraction agent may reduce the chromium (VI) and at the time of reduction it may react with the reagent HDEHP. The HDEHP content in the extraction agent used and the ratio between the volume flows of the extraction agent and the sulphate solution in the performed extraction, which preferably takes place countercurrently, are mainly selected on the basis of the initial metal content in the extraction solution fed to the separation stage. If, for example, the iron content is high, an HDEHP content of 1.5 – 1.8 N is preferably selected in order to prevent the total volume of the extraction agent circulating in the separation process from becoming disadvantageously high. Usually it is preferable to choose a high HDEHP content, depending on the developed extraction or regeneration conditions.

The extraction process is considerably simplified when the extraction of chromium is entirely eliminated. The necessary number of extraction stages can then be determined simply by taking into consideration that the final refined product, i.e., the chromium solution obtained from the extraction stage, meets the prescribed purity requirements. A pure iron product can be recovered from the extract, i.e., the ferriferous HDEHP solution obtained from the extraction.

It has also been noted that the extraction of iron must be balanced so that the molar ratio between iron and HDEHP in the organic phase will not surpass the value of about 0.2 at any extraction stage. The most critical stage in countercurrent separation is, thus, the one to which ferriferous chromium solution is fed. If the said value is surpassed, polymeric aggregates begin to appear in the organic phase when iron atoms combine with each other to an increasing extent through O-P-O bridge groups. In practice this is manifested so that the organic phase, having been an easily handled solution, can rapidly obtain a pulpy state. It is, however, easy to extract iron without the danger of precipitation in the organic phase by selecting a sufficiently high HDEHP content for this separation and a sufficiently high ratio between the volume flows of the extraction agent and the sulphate solution. However, the content of sulphuric acid in the chromium solution fed into the ferriferous chromium solution must not then be allowed to strongly decrease at times, because this may lead to too great an extraction of iron at the critical first extraction stage.

Thus, a practicable extraction range for separating iron (III) from a chromium (III) sulphate solution containing sulphuric acid can be delimited in regard to the ratio between the volume flows of the extraction agent and the sulphate solution ($V_o/V_{aq}$) and in regard to the HDEHP content ($C_{HDEHP}$) for each separate initial iron content in the sulphate solution. The delimination can be done partly by a curve which gives the pairs of minimum possible values $V_o/V_{aq}$ and $C_{HDEHP}$ which are the definite minimums because of precipitate formation in the extraction agent, partly by the limit of maximum possible $C_{HDEHP}$ which, with the used $V_o/V_{aq}$ value in question, no longer yields a satisfactory separation of the phases, and finally by the highest possible ratio $V_o/V_{aq}$ which can be used in the extraction apparatus in question with a given value of $V_{aq}$.

In this extraction process for a selective separation of iron (III) and chormium (III) in a relatively strong sulphuric acid environment the extraction of iron is based on the strongly iron-extracting reagent HDEHP. Because the separation often concerns considerable amounts of iron, the HDEHP content in the extraction agent used is relatively high, usually over 1 M. In different technologically interesting regeneration processes according to which iron can be removed from such a concentrated HDEHP solution, a regeneration based on an acid chloride environment was considered the most practical alternative. In this case, a 6 M hydrochloric acid was noted to have the greatest regeneration efficiency.

The iron is preferably removed from the HDEHP solution with a hydrochloric acid solution which circulates countercurrently in relation to the former, and from which iron can be easily removed with an extraction agent which again can be easily regenerated with water. Thus, iron can be removed from the extraction process in the form of a concentrated solution. The hydrochloric acid circulation prerequires only an addition of hydrochloric acid, preferably in the form of gaseous hydrogen chloride or concentrated hydrochloric acid solution, which replaces the amount hydrochloric acid used for the regeneration of the HDEHP, equivalent to the amount of extracted iron, and the hydrochloric acid amount extracted in the regeneration of ferriferous hydrochloric acid, equivalent to the thereby formed ferrichloride. This ferriferous hydrochloric acid is preferably regenerated by extracting the iron in the form of $HFeCl_4$. The chloride extracted along with the iron can, however, be returned to a greater or lesser extent to the hydrochloric acid circulation in the form of hydrogen chloride by a roasting or fractional distillation process, depending on whether the product of the iron process line is purple ore or ferrichloride.

Usually chloride cannot be allowed in the purified chromium solutions in question. This is true if, for example, the purpose is to manufacture electrolytically metallic chromium at the next stages of the process. In any case, it is very simple to remove all chloride from the HDEHP solution by countercurrently washing, with water containing sulphuric acid, the HDEHP solution regenerated with hydrochloric acid. This prevents the chloride from coming into contact with the ferriferous chromium solution entering the extraction stage. The extraction process for the separation of chromium (III) and iron (III) can thus be carried out advantageously with the extraction apparatus flow scheme shown in FIG. 1.

The most essential point in this separation process is the separation of the metals chromium (III) and iron (III) which is based on the important observation that the especially important separation of these metals can be obtained with the reagent HDEHP, preferably from an environment with a relatively strong sulphuric acid content at a raised temperature, in which case the HDEHP content is preferably also higher than is usual in other extraction processes. The removal of extracted iron from the use extraction agent has, however, proven more difficult by other previously known processes, such as acid reduction processes, than by regeneration which is based on an acid chloride solution. For this, a chloride environment which is completely hydrochloric acid is preferably used. When lesser iron amounts are extracted, a hydrochloric acid which has been concentrated as much as possible in regard to iron by repeated regenerations can be mainly considered a waste liquor which must preferably be neutralized with lime to protect the environment, but when greater amounts of iron are extracted, this possibility is out of question. In such a case it is without question preferable to use closed hydrochloric acid circulation, provided that the iron can be removed from it. This can also be relatively simply realized by an extraction process for which a special reagent combination has been developed. This was evident from the experiments which in the first place dealt with different tertiary amines, quaternary ammonium salts, and alkyl phosphates, which all could in this case be regenerated by using only water as an extraction agent. These experiments indicated that the light petroleum solutions of these reagents could not be used for extracting iron from the hydrochloric acid solutions in question without the formation of three phases. Therefore it was necessary to modify the organic phase with a higher alcohol.

Systematic experiments indicated that the most promising amine-based extraction agent alternative was an isodecanolmodified light petroleum solution of the tertiary amine product Adogen 382 (an Ashland chemical product). The extraction of hydrochloric acid was the least significant along with this extraction agent. It was, however, evident that even this reagent cannot successfully eliminate the extraction of hydrochloric acid if the purpose is to recover by extraction process a ferri-chloride solution as concentrated as possible. This was confirmed by countercurrent experiments carried out with a laboratory mixer-settler apparatus. The extraction of a ferriferous amine phase proved difficult if the amine content in the used extraction agent surpassed 0.3 M, which was due to a not fully satisfactory phase separation and a somewhat disadvantageous regeneration balance. Especially if the portion of iron in the chromium solution added to the separation process is considerable, it is more appropriate to choose another extraction agent alternative for removing the iron (III) from the hydrochloric acid environment in question. Iron can be extracted very well by extracting the acid complex $HFeCl_4$. The experiment indicated that an extraction agent component mixture which preferably contains tributyl phosphate (TBP) 40 vol.-%, isodecanol 25 vol.-%, and light petroleum 35 vol.-%, constitutes an extraction agent which has both a high extraction capacity and an excellent capability of being regenerated. It must, however, be taken into consideration that when this extraction agent is used, hydrochloric acid which slightly surpasses the extracted molar proportion of iron is extracted from the hydrochloric acid circulation.

To prevent the lowering of the proportion of hydrochloric acid in the hydrochloric acid circulation, preferably gaseous hydrogen chloride must be added to it. If it is not specifically desired to synthetize the hydrogen chloride for this purpose by causing hydrogen to react with chlorine in a burner reserved for this purpose, there is a possibility depending on whether the iron is recovered from the process in an oxide or chloride form, to recover hydrogen chloride from extraction solution which contains sulphuric acid and ferrichloride, by a removal process based on fractional distillation and/or roasting.

EXAMPLES

EXAMPLE 1

It was proven by this separation experiment that the extraction of iron (III) by a light petroleum solution of the reagent HDEHP takes place fully selectively from a chromium (III) solution containing sulphuric acid. No extraction of chromium (III) chemically bound to HDEHP could be proven.

A suitable experimental solution was a ferriferous chromium sulphate solution with the following composition: $Cr^{3+}$ 61 g/l, $Fe^{3+}$ 29 g/l, $(NH_4)_2SO_4$ 200 g/l and $H_2SO_4$ 110 g/l. A light petroleum solution with an HDEHP content of 1.5 M was again chosen as a suitable extraction agent.

Two parallel experiments were performed by bringing 300 ml of sulphate solution into contact with 480 ml of the extraction agent by mixing them at a temperature of 55°C. The phase contact was obtained in a cylindrical extraction apparatus the volume of which was 1 liter and which was provided with vertical, even flow barriers to achieve an appropriate mixing of the phases. It can be mentioned that at the end of the mixing the phases separated excellently. The total amount of chromium in the sulphate solution was determined very precisely after the extraction has been completed in both experiments. In this case, the small amount of sulphate solution which was sticking in drops to the extraction apparatus was taken into consideration by rinsing it with hot water and by determining the amount of chromium from the collected rinsing water. Table 1 indicates that the extraction of chromium (III) does not take place with a HDEHP-based extraction agent, while the proportional amount of extracted iron was 78 %.

TABLE 1

| Material balance of Cr | | Extraction I | Extraction II |
|---|---|---|---|
| Added Cr amount | g | 18.22 | 18.44 |
| Cr amount verified after extraction: In collected sulphate solution | g | 18.07 | 18.30 |
| In collected rinsing water | g | 0.11 | 0.13 |
| Total | g | 18.18 | 18.43 |

EXAMPLE 2

Even though both the regeneration of the HDEHP with hydrochloric acid solution and the extraction of iron (III) with an isodecanol-modified light petroleum solution of TBP and the regeneration of this extraction agent with water are based on reactions which can be considered to be rapid, it is more difficult to determine what the kinetics is for the central extraction reaction, i.e., the separation of chromium (III) and iron (III), namely, the extraction of iron (III) at an elevated temperature with a relatively strong light petroleum solution of HDEHP from an electrolyte-containing chromium (III) sulphate solution which, is, for example, over 1 M in regard to both sulphuric acid and chromium. Therefore it was considered well-founded to illustrate by this example that the extraction of iron with HDEHP under the said reaction conditions really takes place relatively rapidly.

In this extraction experiment, the same extraction procedure, apparatus, and solutions were used as in Example 1. The extraction results obtained by analysis from dispersion samples taken at different times are compiled in Table 2. It indicates that a contact period of 5 – 10 minutes is almost sufficient for the phases in question to obtain an extraction balance. This being the case, very much attention need not be paid to the slightly slow extraction reaction of the iron (III)/chromium (III) separation in question when planning a suitable multistage extraction apparatus for this metal separation process.

TABLE 2

| | | Extraction kinetics for iron (III) | | | | | | | |
|---|---|---|---|---|---|---|---|---|---|
| Time | min | 0 | 1 | 5 | 10 | 20 | 40 | 60 | 90 | 120 |
| Proportional extraction of iron (III) | % | — | 65.6 | 76.5 | 77.5 | 78.3 | 77.9 | 77.7 | 77.7 | 77.9 |

EXAMPLE 3

The extraction of chromium (III) and iron (III) is preferably carried out as a continuous-working extraction process with two extraction solution circulation circuits and one regeneration circulation circuit. All phase contacts preferably take place countercurrently in the necessary number of stages. Because the extraction of iron in the separation process is fully selective, all distribution procedures of iron used in this process can be simply observed by the McCabe-Thiele method.

With different series of single extraction experiments, the balance values could thus be determined for the extraction or regeneration procedures used in the developed separation process. With stage reconstructions, made by the McCabe-Thiele method, of the countercurrent procedure which is based on the separation of iron (III) from a chromium (III) solution with the composition given in Example 1, it could finally be verified that with appropriate reagent contents the content of iron in the said chromium solution can be lowered to a few ppm in 5 – 7 extraction stages, the light petroleum solution of HDEHP used for this can be regenerated in 5 – 6 stripping stages and in 2 – 4 chlorine-removing washing stages, the hydrochloric acid solution used for the regeneration of the HDEHP solution can be regenerated in 3 – 4 extraction stages, and finally the isodecanol-modified light petroleum solution of TBP can be regenerated with water in 3 – 5 stripping stages. The balance values determined for the respective countercurrent procedures are compiled in Table 3 – 7, which also indicate the ratios between the volume flows of the solutions for which stage reconstruction were made. These calculated extraction results have later been verified quite well by performed continuous-working countercurrent experiments.

Even though the chromium content in the sulphate solution cannot thus be changed by this separation process, it easily causes concentration of iron. With the initial iron content in the chromium solution in question, given in this example, very pure iron (III) solution with an iron content of 50 – 60 g/l is obtained with, for example, the said numbers of stages in the various parts of the process.

TABLE 3

Countercurrent extraction of Fe(III) from Cr(III) solution containing sulphuric acid Sulphate solution: $Cr^{3+}$ 61 g/l, $Fe^{3+}$ 30 gl/l, $H_2SO_4$ 110 g/l, $(NH_4)_2SO_4$ 200 g/l Extraction agent: 1.8 M HDEHP; solvent: light petroleum; extraction temperature: 55°C; $V_o/V_{aq} = 1.6$ Balance value pair:

($y$ = iron content in organic phase,
$x$ = iron content in aqueous phase)

$y$ mole Fe/mol HDEHP 0.059 0.094 0.135 0.156 0.173 0.188 0.213 0.228

$x$ mol Fe/mol Cr 0.020 0.034 0.053 0.083 0.119 0.172 0.266 0.403

Necessary number of extraction stages: 5–7.

TABLE 4

Countercurrent regeneration of ferriferous HDEHP solution. Ferriferous extraction agent: HDEHP 1.8 M; solvent: light petroleum; iron content: 0.174 mol Fe/mol HDEHP; regeneration agent: 5.85 M HCl; regeneration temperature: 25°C; $V_o/V_{aq} = 1$.

Balance value pair:

($y$ = iron content in organic phase,
$x$ = iron content in aqueous phase)

$y$ mol Fe/mol HDEHP 0.0115 0.0200 0.0418 0.0710 0.0932 0.118 0.150

$x$ mol Fe/mol HCL 0.0057 0.0108 0.0235 0.0383 0.0495 0.0594 0.0683

Necessary number of regeneration stages: 5–6.

TABLE 5

Countercurrent wash of chloride-containing HDEHP solution. Chloride-containing extraction agent: HDEHP 1.5 M; solvent: light petroleum; $Cl^-$ content: 0.0105 mol $CL^-$/mol HDEHP; washing solution: 1-% $H_2SO_4$; washing temperature: 25°C; $V_o/V_{aq} = 5$.

Balance value pair:

(Y = $Cl^-$ content in organic phase,
x = $Cl^-$ content in aqueous phase)

$y$ mol $Cl^-$/mol HDEHP 0.00020 0.00038 0.00058 0.00100 0.00137

$x$ mol $Cl^-$/mol $H_2O$ 0.00028 0.00070 0.00097 0.00132 0.00179

Necessary number of washing stages: 2–4

TABLE 6

Countercurrent regeneration of ferriferous HCl solution. Ferriferous HCl solution: HCl content 4.90 M, $Cl^-$ content 5.80 M, Fe content 0.32 M; regenerating extraction agent: TBP 40 % vol., isodecanol 25 % vol., light petroleum 35 % vol.; regeneration temperature: 25°C; $V_o/V_{aq} = 0.63$ Balance value pair:

($y$ = iron content in organic phase,
$x$ = iron content in aqueous phase)

$y$ M 0.305 0.367 0.428 0.479 0.488 0.533 0.547 0.565

$x$ M 0.0065 0.0190 0.0557 0.124 0.133 0.212 0.261 0.304

Necessary number of regeneration stages: 3–4

TABLE 7

Countercurrent regeneration of ferriferous TBP-isodecanol solution.

Ferriferous extraction agent: TBP 40 % vol., isodecanol 25 % vol, light petroleum 35 % vol., iron content 0.50 M; regeneration agent: 0.02 M HCl; regeneration temperature 25°C; $V_o/V_{aq} = 2.1$ Balance value pair:

($y$ = iron content in organic phase
$x$ = iron content in aqueous phase)

$y$ M 0.0031 0.0343 0.0380 0.187 0.354

$x$ M 0.315 0.570 0.577 0.839 1.02

Necessary number of regeneration stages: 3–5

EXAMPLE 4

Figure 2:
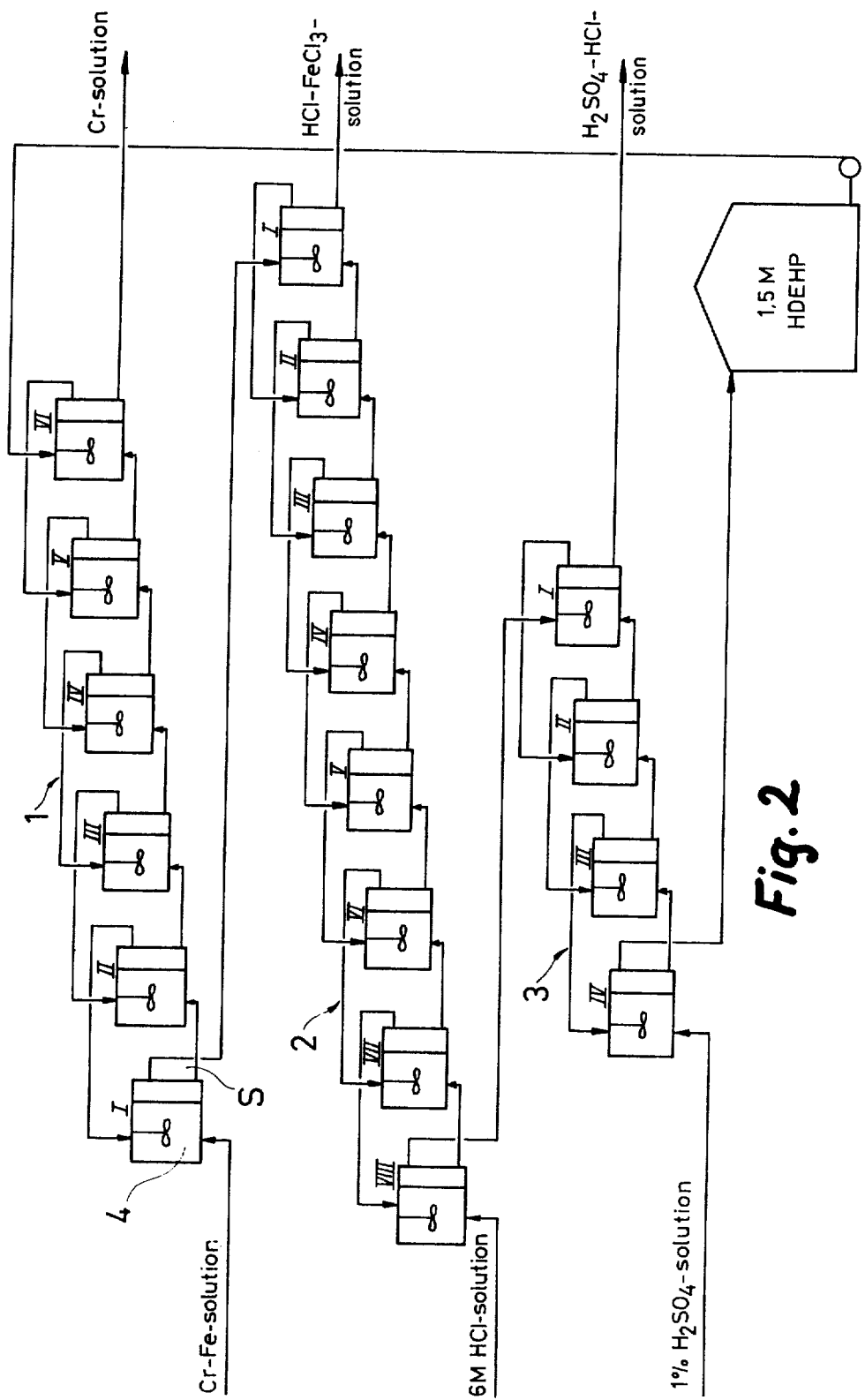

Iron (III) was separated from chromium (III) solution with a continuous-working, 18-stage pilot-scale extraction apparatus (FIG. 2). Extraction part 1 comprises 6 stages, regeneration part 2 eight stages, and washing part 3 four stages. All the parts act according to the countercurrent principle. Each stage consists of a mixing chamber 4 with a volume of 40 liters and a settler tank 5 with the volume of also 40 liters and surface area of 9.9 dm².

The initial solution contained 61.6 g/l Cr, 30.3 g/l Fe, 134 g/l $H_2SO_4$ and 221 g/l $(NH_4)_2SO_4$, and it was fed to the extraction apparatus at the temperature of 60°C and at the rate of 40 l/h. The HDEHP solution used was 1.5 M and its feeding rate 70 l/h. Regeneration of iron from the HDEHP solution took place at room temperature with a 6 M HCl solution, the feeding rate of which was 70 l/h. After the regeneration, the HDEHP solution was washed at room temperature with a water containing 1 % of $H_2SO_4$ and of which the feeding rate was 15 l/h. The extraction results are given in Tables 8, 9, 10 and 11, and they correspond well to the extraction results forecast on the basis of the laboratory experiments.

TABLE 8

Chromium, iron and sulphuric acid contents in chromium solution in extraction part in stages

| Extraction stage 1 | Cr g/l | Fe g/l | $H_2SO_4$ g/l |
|---|---|---|---|
| I | 60.8 | 13.3 | 158 |
| II | 59.9 | 0.98 | 188 |
| III | 59.6 | 0.071 | 187 |
| IV | 59.5 | 0.011 | 185 |
| V | 60.2 | 0.008 | 189 |
| VI | 57.3 | 0.005 | 182 |

TABLE 9

Iron contents in hydrochloric acid solution in regeneration part in stages

| Regeneration stage 2 | Fe g/l |
|---|---|
| I | 16.9 |
| II | 7.6 |
| III | 3.6 |
| IV | 1.8 |
| V | 0.91 |
| VI | 0.39 |
| VII | 0.20 |
| VIII | 0.09 |

TABLE 10

Chloride contents in HDEHP and sulphuric acid solutions in washing part in stages

| Washing stage 3 | HDEHP Cl⁻ g/l | $H_2SO_4$ solution Cl⁻ g/l |
|---|---|---|
| I | <0.005 | 6.6 |
| II | <0.005 | 1.2 |
| III | <0.005 | 0.12 |
| IV | <0.005 | 0.065 |

TABLE 11

HDEHP contents in water solutions in the parts of extraction apparatus

| Part of extraction apparatus | Solution | HDEHP content mg/l |
|---|---|---|
| Extraction 1 | Cr Solution | 15 |
| Regeneration 2 | HCl-FeCl₃ solution | 60 |
| Wash 3 | H₂SO₄-HCl solution | 60 |

What is claimed is:

1. A process for selective extraction of iron (III) from an acid aqueous solution containing iron (III) and chromium (III) which comprises extracting iron (III) from an aqueous sulphate solution containing more than 50 g/l $H_2SO_4$ at an elevated temperature with a hydrocarbon solution of a substantially water immiscible organic extractant, said extractant being an acid alkyl-substituted phosphoric compound.

2. The process of claim 1 wherein after the iron is extracted the hydrocarbon solution is separated from the acid aqueous solution, the extraction solution is regenerated, and the regenerated extraction solution is recycled to the extraction process.

3. The process of claim 1 wherein the extractant is di-(2-ethylhexyl) phosphoric acid.

4. The process of claim 1 wherein the hydrocarbon solution is a solution of 1.3 – 1.8 M di-(2-ethylhexyl) phosphoric acid in kerosene.

5. The process of claim 1 wherein extraction is carried out at a temperature of from 50°C to 70°C.

6. The process of claim 1 wherein said aqueous sulphate solution contains from 100 to 200 g/l $H_2SO_4$ and also contains ammonium sulphate.

7. The process of claim 1 and including the steps of separating iron in the form of a ferriferous solution containing said extractant, regenerating said extractant by contacting said ferriferous solution with an aqueous hydrochloric solution to obtain a ferriferous hydrochloric solution, removing iron from said ferriferous hydrochloric solution with a mixed extracting agent consisting of about 40% tributylphosphate, about 35% isodecanol and about 25% kerosene by volume, and then regenerating said mixed extraction agent with water.

* * * * *